United States Patent
Bressan

(10) Patent No.: US 8,355,595 B2
(45) Date of Patent: Jan. 15, 2013

(54) CONTRAST ENHANCEMENT METHODS AND APPARATUSES

(75) Inventor: Marco Bressan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 986 days.

(21) Appl. No.: 11/803,547

(22) Filed: May 15, 2007

(65) Prior Publication Data

US 2008/0285853 A1   Nov. 20, 2008

(51) Int. Cl.
  *G06K 9/40* (2006.01)
  *G06K 9/00* (2006.01)
(52) U.S. Cl. .................................. 382/274; 382/266
(58) Field of Classification Search ............ 382/169, 382/266, 274
  See application file for complete search history.

(56) References Cited

U.S. PATENT DOCUMENTS

| | | | |
|---|---|---|---|
| 5,426,684 A * | 6/1995 | Gaborski et al. ............... 378/62 |
| 5,524,070 A | 6/1996 | Shin et al. | |
| 5,581,370 A | 12/1996 | Fuss et al. | |
| 5,822,453 A * | 10/1998 | Lee et al. ...................... 382/169 |
| 6,072,907 A | 6/2000 | Taylor et al. | |
| 6,163,621 A | 12/2000 | Paik et al. | |
| 6,353,674 B1 | 3/2002 | Dewaele | |
| 6,463,181 B2 | 10/2002 | Duarte | |
| 6,535,648 B1 | 3/2003 | Acharya | |
| 6,717,698 B1 * | 4/2004 | Lee ................................ 358/1.9 |
| 6,782,137 B1 | 8/2004 | Avinash | |
| 6,826,310 B2 * | 11/2004 | Trifonov et al. ............... 382/274 |
| 6,915,024 B1 | 7/2005 | Maurer | |
| 7,023,580 B2 * | 4/2006 | Zhang et al. ................. 358/1.9 |
| 7,031,534 B2 | 4/2006 | Buckley | |
| 7,068,841 B2 * | 6/2006 | Luo ............................... 382/167 |
| 7,170,645 B2 | 1/2007 | Kim et al. | |
| 7,460,691 B2 * | 12/2008 | Ng et al. ....................... 382/107 |
| 2003/0053690 A1 | 3/2003 | Trifonov et al. | |
| 2003/0153823 A1 | 8/2003 | Geiser et al. | |
| 2003/0161519 A1 * | 8/2003 | Vuylsteke ..................... 382/128 |
| 2004/0042676 A1 | 3/2004 | Srinivasa | |
| 2006/0291742 A1 | 12/2006 | Zhang et al. | |
| 2007/0009167 A1 | 1/2007 | Dance et al. | |
| 2007/0053607 A1 * | 3/2007 | Mitsunaga ................... 382/274 |
| 2007/0126921 A1 * | 6/2007 | Gallagher et al. ........... 348/362 |

FOREIGN PATENT DOCUMENTS

| EP | 0 527 525 | 10/1996 |
|---|---|---|
| WO | WO 02/15113 A2 | 2/2002 |

OTHER PUBLICATIONS

Fisher et al., "Canny Edge Detector," University of Edinburgh, UK, pp. 1-5, 1994.
"Co-occurrence matrix," Wikipedia, 2 pages, at http://en.wikipedia.orq/wiki/ . . . , last visited Jan. 22, 2007.

(Continued)

*Primary Examiner* — Matthew Bella
*Assistant Examiner* — Patrick Edwards
(74) *Attorney, Agent, or Firm* — Fay Sharpe LLP

(57) ABSTRACT

Image contrast enhancement includes (i) computing a contrast measure incorporating an adjustable tone transformation function and one or more statistical measures of selected spatial arrangements of pixel or voxel intensities in an analysis image or image portion, (ii) adjusting the adjustable tone transformation function to increase contrast as indicated by the contrast measure, and (iii) enhancing contrast of a target image or image portion using the adjusted tone transformation function.

22 Claims, 12 Drawing Sheets

OTHER PUBLICATIONS

"Using a Gray-Level Co-Occurrence Matrix (GLCM)," The Mathworks, Inc., pp. 1-4, at www.mathworks.com/access/helpdesk/help/toolbox/ . . . , (2006).

"Luminance," Wikipedia, 2 pages, at http://en.wikipedia.orq/wiki/Luminance, last modified Nov. 29, 2006.

"YIQ," Wikipedia, 3 pages, at http://en.wikipedia.org/wiki/YIQ, last modified Nov. 27, 2006.

Hjelmas et al., "Face Detection: A Survey," Academic Press, pp. 236-274, (2001).

"Laplace operator," Wikipedia, pp. 1-6, at http://en.wikipedia.org/wiki/Laplacian . . . , last modified Dec. 28, 2006.

Dicarlo et al., "Rendering high dynamic range images," Proc. of SPIE: Image Sensors, 10 pages, (2002).

Aksoy et al., "Textural Features for Image Database Retrieval," IEEE Workshop on Content-Based Access of Image and Video Libraries, pp. 45-49, (1998).

Turpin, "Night Vision Goggles (NVGs) and NVG Equipment with Market Potential," PLRA, pp. 1-58, (2001).

Bressan et al., "Local Contrast Enhancement," Symp. On Electronic Imaging, San Jose, CA, Jan. 28-Feb. 1, 12 pages, (2007).

Sezgin et al., "Survey over image thresholding techniques . . . ," Journal of Electronic Imaging 13(1), 146-165 (2004).

Ledda et al., "Evaluation of Tone Mapping Operators Using a High . . . ," Proc. ACM SIGGRAPH '05, pp. 640-648, (2005).

Fattal et al., "Gradient Domain High Dynamic Range Compression," Association for Computing Machinery, Inc., pp. 249-256, 2002.

Melloul et al., "Segmentation of microcalcification in X-ray mammograms . . . ," CARS/sPRINGER, pp. 1-6, (2002).

Karani et al., "Co-occurrence Matrices for Volumetric Data," Proc. Computer Graphics and Imaging, 6 pages, (2004).

* cited by examiner

CONTRAST ENHANCEMENT METHODS AND APPARATUSES

BACKGROUND

The following relates to the imaging, photographic, photofinishing, image enhancement, and related arts. The following is generally applicable to digital images of substantially any type and to devices for acquiring same, such as cameras, camcorders, web cameras, x-ray or other radiographic imagers, and so forth. The following is further generally related to images generated by photography, optical scanning of hardcopies, images generated by virtual image generation systems, and so forth. The following is generally applicable to two-dimensional images, three-dimensional images, or higher dimensional images. The following is generally applicable to color images, gray scale images, radiographic images, and so forth.

Digital imaging systems such as digital cameras, camcorders, web cameras, and so forth directly generate digital images. For example, a digital camera acquires an image using a charge-coupled device (CCD) array or other photodetector array. Film-based imaging systems such as 35-mm cameras, x-ray systems that use x-ray photographic plates, and so forth also can generate digital images, albeit indirectly, for example by optically scanning the film image. As images in digital form proliferate, there is increasing interest in applying photofinishing or image enhancement techniques to improve image characteristics such as hue, contrast, and so forth.

In the area of contrast enhancement, global and local techniques are known. Local approaches can provide effective contrast enhancement, are computationally intensive. Local approaches can also introduce artifacts, such as transition or boundary artifacts at the boundaries of different local contrast enhancement regions.

In a typical global technique, the intensities of pixels are adjusted based on a tone reproduction curve (TRC) that is expected to produce contrast enhancement. The gamma correction is one such generally contrast enhancing curve. A disadvantage of these approaches is that the selected TRC may provide little or no contrast enhancement for certain images, or may produce quality degradation such as a washed out image or a noise-enhanced image. In some image processing systems, the user can manually adjust the TRC for an image. This approach can provide good contrast enhancement, but depends on the skill of the operator and cannot be automated.

Automated global contrast enhancement based on content of the image has frequently utilized intensity histogram information. In a histogram equalization technique, a histogram of the intensity levels of pixels of an image is generated, and a TRC is selected and applied that generally equalizes the levels across the histogram. Empirically, such approaches have been found to provide some contrast enhancement, and are readily automated. Histogram equalization approaches can be justified in a non-rigorous manner by recognizing that the equalized histogram fully utilizes the grayscale range. However, enhancement by histogram equalization can degrade image quality. Equalization can produce excessive intensity level variation in dominant dark or dominant light regions of the image. When these regions contain noise such as sensor noise or compression artifacts, the result is that the noisy response is enhanced in the output image.

CROSS REFERENCE TO RELATED PATENTS AND APPLICATIONS

The following commonly assigned U.S. patents and co-pending U.S. patent applications are each incorporated herein by reference in its entirety.

Dance et al., U.S. Published Application 2007/0009167 A1 entitled "Contrast Enhancement of Images" is incorporated herein by reference in its entirety. This published application discloses at least a method and system for contrast enhancement of an input image that utilizes luminance values of pixels of the input image to derive transforms. The method down-samples and partitions an image into sub-images whereby transforms are generated for selected sub-images. The selected sub-image transforms are used to generate an output transform which is applied to the input image for local contrast enhancement of the image. Furthermore, a decision method as to whether or not the input image is to receive local contrast enhancement wherein darkness features of the input image are compared to threshold values and combined into an expression which results in the determination.

Buckley, U.S. Pat. No. 7,031,534 entitled "Enhancement of Compressed Image Data" is incorporated herein by reference in its entirety. This patent discloses at least a xerographic apparatus, a printer, a printer server, and the like that processes wavelet domain image data and includes means for receiving the wavelet domain image data representative of an input digital image. The wavelet domain image data may be formatted as a JPEG 2000 compressed file or other wavelet domain file including N levels of wavelet decompositions. An M-level extractor extracts an Mth level wavelet decomposition from the wavelet domain image data where M is <N. The extracted Mth level wavelet decomposition is a low resolution representation of the input digital image. An image enhancement system receives the extracted Mth level wavelet decomposition and derives an enhancement process such as a tone reproduction curve, a sharpness filter, and the like from the extracted Mth level wavelet decomposition. The enhancement process is used to enhance a higher resolution representation of the digital input image.

Taylor et al., U.S. Pat. No. 6,072,907 entitled "Method and Apparatus for Enhancing and Thresholding Images" is incorporated herein by reference in its entirety. This patent discloses at least an image processing method and system for generating enhanced binary image data from greyscale input image data. The method includes the steps of (a) receiving first image data, the first image data being greyscale image data defining an input image, (b) performing a high frequency boost operation on the first image data to produce second image data, (c) performing a linear interpolation operation on the second image data to produce third image data, the third image data having a resolution higher than the resolution of the second image data, (d) performing a contrast enhancement operation on the third image data to produce fourth image data, and (e) thresholding the fourth image data to produce fifth image data, the fifth image data being binary image data defining an output image. The techniques find application, for example, in over-the-desk scanning of documents, and in video-conferencing.

Fuss et al., U.S. Pat. No. 5,581,370 entitled "Image-Dependent Automatic Area of Interest Enhancement" is incorporated herein by reference in its entirety. This patent discloses at least a method of improving the contrast in a natural scene image. A relevant histogram of the image is derived for from a selected subset of local histograms representing regions of the image. The signal describing the histogram is operated on with a filter having the characteristic of weakening strong peaks and valleys in the function, but not effecting flat portions of the signal. The filtered histogram signal is used for controlling the TRC mapping in a device at which the image is to be printed. To assure optimum selection of local histograms, regions including the black point and white point of an image are determined and added to the subset of local histograms representing regions of the image.

BRIEF DESCRIPTION

In accordance with certain embodiments illustrated herein, there is disclosed a contrast enhancement method comprising: computing a global contrast measure incorporating measures of occurrences of selected spatial arrangements of selected pixel or voxel intensities in an analysis image or image portion, and optionally incorporating an intensity distance metric; adjusting an adjustable tone transformation function to generate a contrast enhancing tone transformation that optimizes the global contrast measure; and enhancing contrast of a target image or image portion using the contrast enhancing tone transformation.

In accordance with certain embodiments illustrated herein, there is disclosed an apparatus comprising: a co-occurrence matrix calculator configured to compute at least some co-occurrence matrix terms or a function of co-occurrence matrix terms for an analysis image or image portion; a contrast measure calculator configured to compute a contrast measure incorporating said computed co-occurrence matrix terms or function of co-occurrence matrix terms; an optimization engine configured to adjust an adjustable tone transformation function to generate a contrast enhancing tone transformation that optimizes the contrast measure; and a contrast enhancer configured to enhance contrast of a target image or image portion using the contrast enhancing tone transformation.

In accordance with certain embodiments illustrated herein, there is disclosed an imaging device comprising: an imaging sensor configured to acquire an image; a processor; and an output including at least one of a display configured to display a contrast enhanced image, and digital data storage configured to store a contrast enhanced image. The processor is configured to: compute a contrast measure incorporating an adjustable continuous monotonic tone transformation function and one or more statistical measures of selected spatial arrangements of pixel or voxel intensities in the acquired image or a selected portion thereof, adjust the adjustable continuous monotonic tone transformation function to generate a contrast enhancing tone transformation function that optimizes the contrast measure, and apply the contrast enhancing tone transformation function to the acquired image to generate a contrast enhanced image.

In accordance with certain embodiments illustrated herein, there is disclosed a storage medium storing instructions executable to perform a contrast enhancement method including the operations of (i) computing a contrast measure incorporating an adjustable continuous monotonic tone transformation function and one or more statistical measures of selected spatial arrangements of pixel or voxel intensities in an analysis image or image portion, (ii) adjusting the adjustable continuous monotonic tone transformation function to optimize the contrast measure, and (iii) enhancing contrast of a target image or image portion using the adjusted continuous monotonic tone transformation function.

BRIEF DESCRIPTION OF THE DRAWINGS

FIG. 10 shows the global contrast measure $F_{adj}$ plotted against the sigmoid parameters a and b. FIG. 11 plots $|\nabla F(a,b)|$ against the sigmoid parameters a and b.

FIG. 12 shows an original image of a portion of a stained glass window. FIG. 13 shows the contrast enhanced image using optimization of a global contrast measure incorporating spatial dependence information. FIG. 14 shows a comparative image contrast enhanced by conventional histogram equalization.

FIG. 15 shows an original image of a slide including a flower. FIG. 16 shows the contrast enhanced image using optimization of a global contrast measure incorporating spatial dependence information. FIG. 17 shows a comparative image contrast enhanced by conventional histogram equalization.

FIG. 18 shows an original image of a landscape including a steeple. FIG. 19 shows the contrast enhanced image using optimization of a global contrast measure incorporating spatial dependence information. FIG. 20 shows a comparative image contrast enhanced by conventional histogram equalization.

FIG. 21 shows an original image of a statue. FIG. 22 shows the contrast enhanced image using optimization of a global contrast measure incorporating spatial dependence information. FIG. 23 shows a comparative image contrast enhanced by conventional histogram equalization.

DETAILED DESCRIPTION

Figure 1:
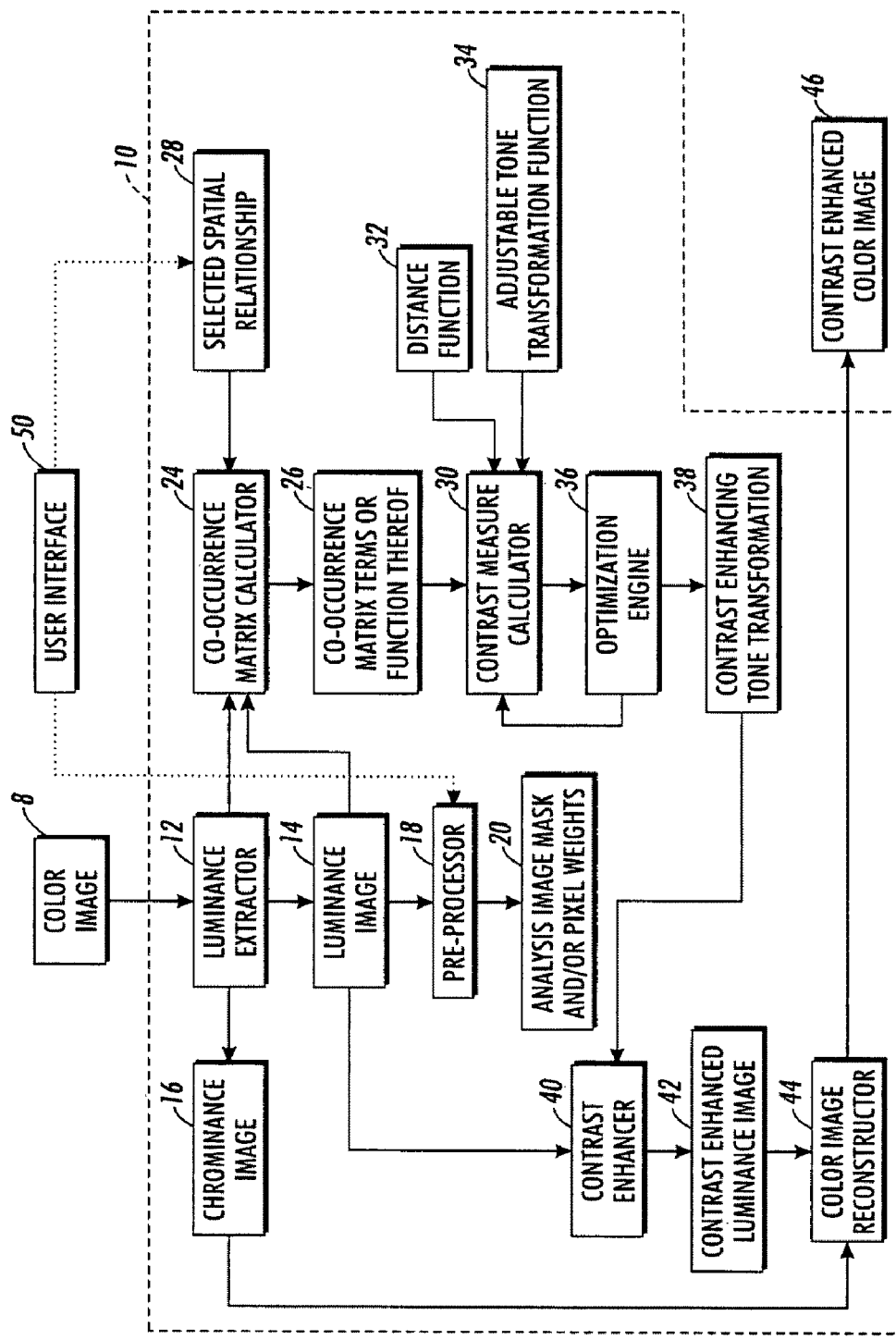
FIG. 1 diagrammatically shows a contrast enhancement system.

With reference to FIG. 1, illustrative contrast enhancement apparatuses and corresponding methods are described. In the illustrative examples, a color image 8 is processed to enhance contrast. Such a color image is made up of pixels (for a two-dimensional image) or voxels (for a three-dimensional or higher-dimensional image) represented by selected color space coordinates, such as (Y,U,V) coordinates, (L*,a*,b*) coordinates, (Y,I,Q) coordinates, (R,G,B) coordinates, or so forth. In the following, a (Y,I,Q) coordinate representation is used. This representation advantageously separates the luminance information into the Y channel or coordinate, while the chrominance information is contained in the (I,Q) channels or coordinates. Those skilled in the art can readily convert from one color space representation to another, such as from (R,G,B) to (Y,I,Q), and can readily extract the luminance image from a color image. In an illustrative contrast enhancement apparatus 10 shown in FIG. 1, a luminance extractor 12 processes the color image 8 to generate a luminance image 14 and one or more chrominance images 16. The contrast enhancement suitably operates on the luminance image 14.

More generally, the contrast enhancement operates on an intensity image, which corresponds to the luminance image component of a color image. In other embodiments, the input image may be a grayscale image and the intensity values correspond to the grayscale values. The image or image portion may be a color image or image portion, a grayscale image or image portion, a radiographic image or image portion, an infra-red image or image portion, a magnetic resonance image or image portion, a geographical map or map portion, or other bitmapped image or image portion. The image or image portion may also be a two-dimensional image, a three-dimensional image, or a higher-dimensional image. The term "image" as used herein generally refers to any representation using a spatial arrangement of pixels or voxels each having a specified intensity. If the image is grayscale or radiographic or otherwise does not include color or chrominance components, then the illustrative luminance image 14 is suitably replaced by the grayscale, radiographic, or other non-color image. If an image portion is used, the portion may be defined by rectangular coordinates, polygonal coordinates, an image binary mask, or so forth. Moreover, to avoid scale dependency issues, the luminance, grayscale, or other intensity representation is optionally normalized. In the examples herein, the intensities are luminance values normalized to lie in the range [0,1]. For example, if the luminance values of the input image are eight-bit values ranging between 0 and 255, then dividing by 255 provides the desired normalization to the [0,1] interval.

Figure 2:
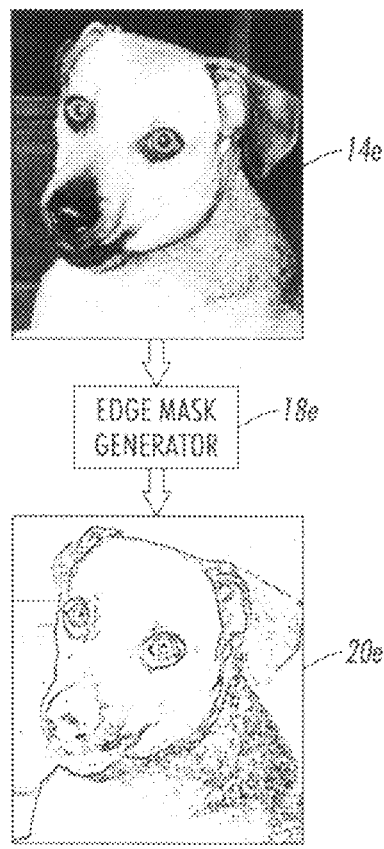
FIG. 2 diagrammatically shows pre-processing of a target image to extract an analysis image portion that preferentially includes edge features.

With continuing reference to FIG. 1 and with brief further reference to FIG. 2, in some embodiments a pre-processor 18 performs selected pre-processing of the image to generate a mask, pixel weights, or other defining characteristics 20 of an analysis image for analysis by the contrast enhancement system. In the illustrated example of FIG. 2, a luminance image 14e (where the suffice "e" in the reference identifier denotes "example") is pre-processed by an edge mask generator 18e that in the illustrated example applies an edge enhancing filter followed by binary thresholding to create a binary analysis image mask 20e that identifies the pixels of the analysis image portion. In the illustrative mask 20e, black pixels correspond to pixels of the analysis image portion, and these black pixels preferentially include edge regions. In other mask embodiments, white pixels may be used to denote pixels of the analysis image portion. The subsequent analysis to generate a contrast-enhancing tone reproduction curve is suitably performed on the analysis image portion identified by the black pixels of the binary analysis image mask 20e. The generated tone reproduction curve is then applied to the entire image to generate the contrast enhancement.

In general, the optional preprocessor 18 optionally selects an image portion for analysis, or weights pixels or voxels of the luminance image 14, such that not all pixels in the luminance image 14 contribute with equal weights to the contrast enhancing tone reproduction curve. For example, in some embodiments a Canny detector is used to generate a binary edge mask. By considering an analysis image portion that preferentially includes edges, the contrast enhancement is optimized for object borders where contrast enhancement is sometimes most useful. Limiting the analysis image or image portion to preferentially include edge regions also reduces the effect of noise that may be present in low detail and dark regions. Such noise is sometimes prevalent in images acquired using low quality image acquisition sensors such as low quality charge-coupled devices.

Rather than limiting the analysis image or image portion to edge regions, it can be limited to other regions of interest. For example, limiting the analysis image region to a face or plurality of faces in the luminance image 14 can be advantageous, since faces are often the focal point of an image. By limiting the analysis image or image portion to a face or plurality of faces, the contrast-enhancing tone reproduction curve is optimized respective to the facial regions, although the derived tone reproduction curve is typically applied to the entire image or a portion of the image that includes more than the facial regions.

In other embodiments, the optional preprocessor 18 employs other selected preprocessing. For example, one undesirable side-effect of contrast enhancement is the possibility of noise enhancement. Such noise enhancement can be reduced by using an analysis image portion including regions having low probability of noise, that is, less noisy regions. In one approach, the analysis image corresponds to pixels weighted by a weighting mask generated by computing the Laplacian operator on the chrominance image 16, eliminating pixels corresponding to luminance edges and then normalizing the values to define weighting values ranging between zero and one. In this embodiment, the preprocessor 18 does not output a binary mask identifying pixels of the analysis image, but rather uses the entire luminance image 14 as the analysis image and generates weighting values 20. In the described Laplacian operator-based weighting mask, the contribution of each pixel or voxel is weighted during contrast enhancement processing by a weighting of one minus the value of the corresponding pixel or voxel of the weighting mask. In similar fashion, weights can be assigned to emphasize the contribution of facial regions or other regions of interest in the image in the contrast enhancement processing.

The preprocessor 18 in other embodiments weights contributions of pixels or voxels of the analysis image or image portion to preferentially enhance impact of edges or other higher contrast regions. For example, rather than using the binary mask 20e to generate an analysis image portion limited to edge regions, the entire luminance image 14 can be used as the analysis image and the edge-enhancement can be used to generate weights that ensure edge regions preferentially contribute to the contrast enhancement processing.

In other embodiments, the preprocessor 16 divides the luminance image 14 into a plurality of analysis image portions that are separately processed by the contrast enhancement system. Optionally, the analysis image portions overlap and are weighted in the overlapping regions by Gaussian or other transition-smoothing weighting coefficients.

It is also to be understood that in some embodiments the entire luminance image 14 is used as the analysis image with no binary masking or weighting of the pixels. In such embodiments, all pixels of the luminance image 14 contribute to the contrast enhancement processing with no weighting applied.

With continuing reference to FIG. 1, the contrast enhancement system employs a global contrast measure incorporating measures of occurrences of selected spatial arrangements of selected pixel or voxel intensities in the analysis image or image portion. In the illustrated embodiment, a co-occurrence matrix calculator 24 computes at least some co-occurrence matrix terms 26, or a function of co-occurrence matrix terms 26, from the analysis image or image portion. The co-occurrence matrix terms or function thereof 26 suitably embody spatial dependence statistics, and are incorporated into the global contrast measure. As used herein, the term "co-occurrence matrix" or "spatial dependence matrix" identifies a multi-dimensional distribution over intensity, or selected terms thereof, or a function of such terms, derived from the analysis image or image portion.

Figure 3:
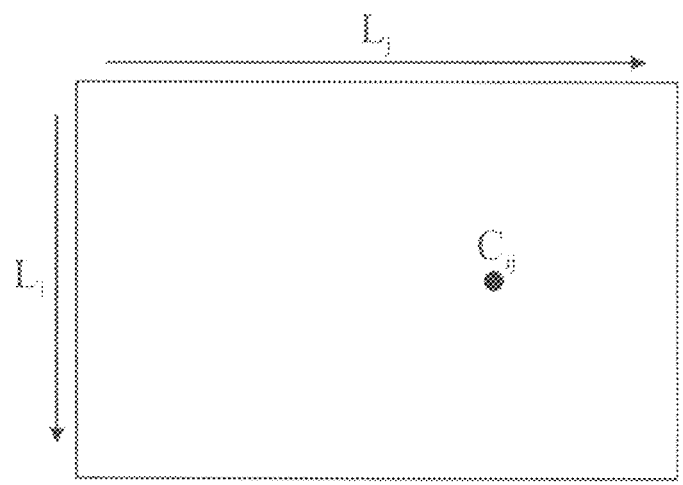
FIG. 3 diagrammatically shows a co-occurrence matrix.

With reference to FIG. 3, an illustrative co-occurrence matrix is two-dimensional. The co-occurrence matrix terms are of the form $c_{ij}$ where the i and j index intensities and the co-occurrence matrix term $c_{ij}$ identifies the number of occurrences of two pixels of intensities indexed i and j, respectively, having a selected spatial relationship 28 in the analysis image or image portion. As a quantitative example, if the analysis image or image portion comprises pixels each having an intensity quantified by a grayscale value, and the grayscale is a 256-level grayscale (optionally normalized to the range [0,1]), then the co-occurrence matrix is a 256×256 matrix. One dimension of the co-occurrence matrix identifies the 256 intensity levels $L_i$ indexed by the index i, while the other dimension of the co-occurrence matrix identifies the 256 intensity levels $L_j$ indexed by the index j. The selected spatial relationship can specify, for example, that the pixel of intensity level $L_j$ should immediately follow the pixel of intensity $L_i$ along a row of pixels of the image. The co-occurrence matrix term $c_{ij}$ is then suitably a count of the number of occurrences (or "co-occurrences") of a pixel of intensity $L_i$ immediately followed by a pixel of intensity $L_j$. In other embodiments, the selected spatial relationship may specify that the pixel of intensity level $L_j$ should immediately follow the pixel of intensity $L_i$ along a column of pixels of the image. Other spatial relationships such as a diagonal spatial relationship can also be specified.

It is contemplated to use co-occurrence matrices of other dimensionalities besides two-dimensional. For example, a three-dimensional co-occurrence matrix can be used, in which each co-occurrence matrix term is a triplet corresponding to a spatial relationship of three pixels or voxels of specified intensities. The selected spatial relationship can also be different or less precise—for example, each co-occurrence matrix term of a three-dimensional co-occurrence matrix may be correspond to a triplet of intensities $(L_i, L_j, L_k)$ all of which must occur within a 3×3 pixel region of a two-dimensional image, or all of which must occur within a 3×3×3 voxel region of a three-dimensional image. As yet another illustrative example, the each co-occurrence matrix term of a two-dimensional co-occurrence matrix may be correspond to a doublet of intensities $(L_i, L_j)$ in which the pixel of intensity $L_j$ must be one of the eight pixels surrounding the pixel of intensity $L_i$.

As still yet another example, instead of using a two-pixel relationship for the selected spatial relationship, a co-occurrence matrix may be used in which, for example, two-dimensional co-occurrence matrix terms $c_{ij}$ accumulate instances in the analysis image or image portion of a selected spatial relationship in which intensities L(i) and L(j) are the minimum and maximum luminance values along a gradient direction, that is, along a direction of maximum intensity variation.

It is to be appreciated that the co-occurrence or spatial dependence matrix 26 does not encompass a conventional intensity histogram, at least because a conventional intensity histogram is one-dimensional and does not store statistical information about spatial relationships between pixels or voxels of selected intensities. An intensity histogram may, for example, indicate that a given two-dimensional image has a significant fraction of high intensity pixels because the high intensity bins of the histogram have large values. However, such an intensity histogram provides no information as to the distribution of high intensity pixels across the image, such as whether the high intensity pixels are grouped together as a high intensity surrounding border, or whether the high intensity pixels are intermingled with lower intensity pixels throughout the image in complex feature-defining structures, or so forth.

If the luminance image 14 is a grayscale image, then there are typically a discrete number of grayscale levels (such as 256 levels in the previous example), and so the co-occurrence matrix has discrete co-occurrence matrix terms. For example, a two-dimensional co-occurrence matrix constructed respective to the 256-level grayscale image has 256×256=65,536 discrete co-occurrence matrix terms. In some embodiments, the co-occurrence matrix terms are represented as a continuous function of the discrete co-occurrence matrix terms, for example by fitting the co-occurrence matrix terms to a polynomial or other continuous fitting function. Such an approach may have computational advantages, may smooth noise in the co-occurrence matrix terms, or may have other advantages.

With returning reference to FIG. 1, a contrast measure calculator 30 computes a global contrast measure for the analysis image or image portion. In general, having closely neighboring pixels or voxels with large differences in intensity corresponds to a high contrast configuration, while having closely neighboring pixels or voxels that are similar in intensity corresponds to a lower contrast. For example, a global contrast representation can be written as:

$$F(k) = \sum_i \sum_j c_{ij}(L(i) - L(j))^k, \quad (1)$$

where $c_{ij}$ are co-occurrence matrix terms, L(i) and L(j) are intensities corresponding to respective indices i and j, and k is a constant. Equation (1) is scale dependent in that the value F(k) will be different for the same image represented using different grayscales. Optionally, the luminance range is normalized to the range [0,1], or to another selected intensity range, prior to computation of the co-occurrence matrix terms. Moreover, it is sometimes advantageous to set forth the global contrast representation in a continuous integral, rather than discrete summation, form, such as:

$$F_1(k) = \int_{x \in \Omega} \int_{y \in \Omega} C(x, y)(x - y)^k \, dx \, dy, \quad (2)$$

where indices x and y are continuous intensities analogous to the discrete intensity levels indexed by i and j, respectively, and $\Omega$ is the luminance space over which the double integral is applied. Optionally, the luminance space $\Omega$ may be normalized to the intensity range [0,1] or to another selected intensity range. It is also contemplated to perform the double integral of Equation (2) or the double summation of Equation (1) over a more restricted range. For example, in evaluating Equation (1) or Equation (2) the co-occurrence matrix terms for which i=j or x=y can be omitted, since those terms have no contribution to F(k) of Equation (1) or to $F_1$(k) of Equation (2). Similarly, for relatively low contrast images, co-occurrence matrix terms for which the difference $(L_i-L_j)$ is large or, equivalently, the difference x-y is large, may be negligibly small and are contemplated to be omitted in such cases. It is also contemplated to enhance computational speed by using a selected sub-set of the co-occurrence matrix terms, such as only those terms for which i and j are even.

The global image contrast representations given by Equation (1) or Equation (2) are illustrative examples. Other image contrast representations can be used. In some embodiments the image contrast representation has a more general form as a double summation over indices i and j of $S_{ij} \cdot f(i,j)$ or a double integral over the indices x and y of $S(x,y) \cdot f(x,y)$, where S denotes the statistical measure of the selected spatial arrangement 28 of pixels or voxels and f denotes a function of the intensities L(i) and L(j) or x and y. For example, the function $f(\ )$ is in some embodiments a distance function employing an exponential integrand, such as in the following illustrative image contrast representation:

$$F_2(\sigma) = \int_{x \in \Omega} \int_{y \in \Omega} C(x, y)\left(1 - e^{-\frac{(x-y)^2}{2\sigma^2}}\right) dx\, dy \qquad (3)$$

$$= 1 - \int_{x \in \Omega} \int_{y \in \Omega} C(x, y) e^{-\frac{(x-y)^2}{2\sigma^2}} dx\, dy,$$

where the shape of the distance function is that of an inverted Gaussian. This distance function advantageously approximates the human eye response, in which the perceived contrast is typically approximately constant above a certain luminance difference controlled by parameter σ, and there is little or no perceived luminance difference for similar intensity values. If σ is sufficiently high with respect to the scale of Ω, then the image contrast $F_2$ is linear with respect to the image contrast $F_1$. In some embodiments, the parameter σ is chosen to depend on one of the luminance dimensions, for example σ=σ(x), as a way to account for luminance adaptation. The lower the value of the parameter σ for a given luminance, the more sensitive the response to variations in that luminance level. In embodiments using an image contrast represented by $S_{ij} \cdot f(i,j)$ or $S(x,y) \cdot f(x,y)$ and in which the function $f(\ )$ represents a distance function, the notation $f(\ )$ is sometimes replaced herein by $D(\ )$ 32 as shown in FIG. 1 to more manifestly identify an intensity distance metric. In some embodiments, such a distance function is configured to more closely approximate typical human perceptual experience by accounting for Weber's "just noticeable difference" law, or with a standard brightness definition, or so forth, and the preprocessor 18 preprocesses the image with a logarithmic mapping, or by a power of ⅓, or so forth.

Figure 4:
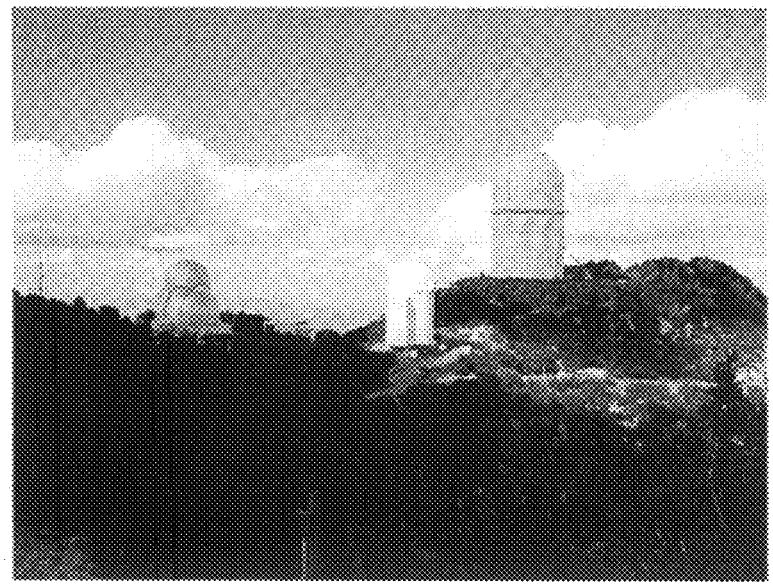
FIG. 4 shows a luminance image of an illustrative landscape.
Figure 5:
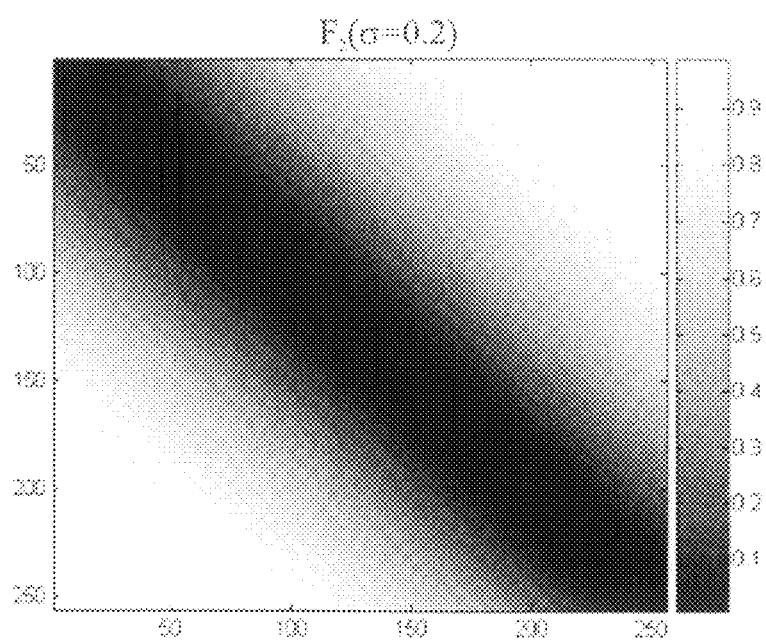
FIG. 5 plots image contrast $F_2$ applied to the image of FIG. 4.
Figure 6:
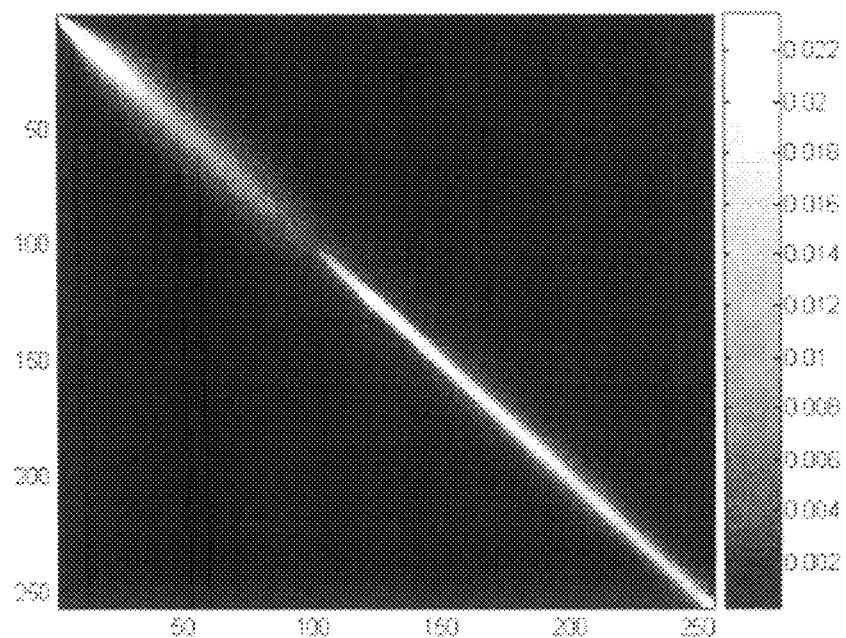
FIG. 6 shows a co-occurrence matrix using the entire image of FIG. 4 as the analysis image.
Figure 7:
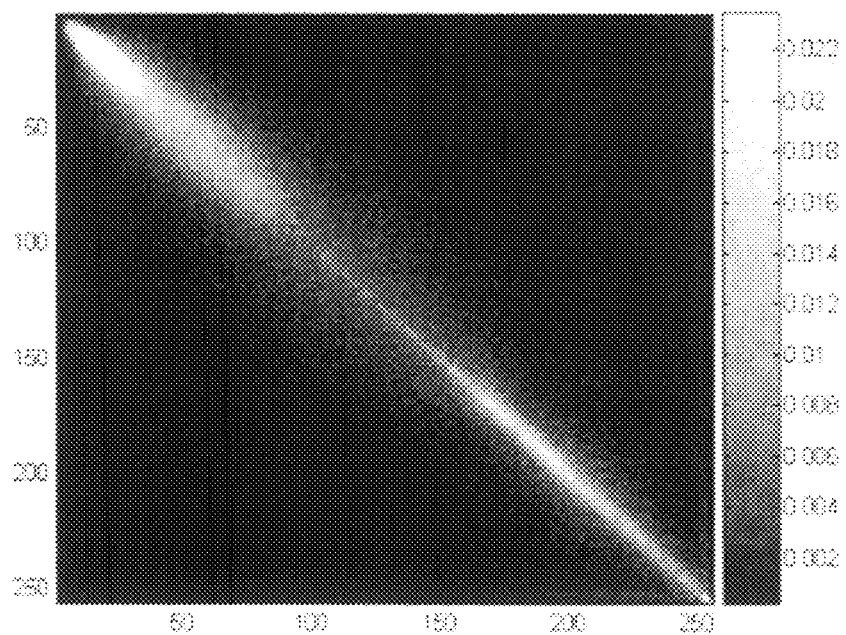
FIG. 7 shows a co-occurrence matrix using a portion of the image of FIG. 4 that preferentially includes edge regions.

With reference to FIGS. 4-7, an illustrative example of the image contrast representation of Equation (3) is presented. FIG. 4 shows an example luminance image of an illustrative landscape. FIG. 5 plots the image contrast representation $F_2$ of Equation (3), with σ=0.2, applied to the image of FIG. 4. FIG. 6 shows a co-occurrence matrix using the entire image of FIG. 4 as the analysis image, and using as the selected spatial arrangement 28 two immediately neighboring pixels. The co-occurrence matrix of FIG. 6 has a relatively narrow feature region along the line L(i)=L(j), which reflects a relatively low contrast and the close intensity similarity of most neighboring pixels in a low contrast image. FIG. 7 shows another co-occurrence matrix, this time constructed for an analysis image portion corresponding to the edge regions of the image of FIG. 4. A binary mask was constructed similarly to the binary mask 20e of FIG. 2, but using a Canny detector. The co-occurrence matrix of FIG. 7 is seen to have a broader feature region extending further away from the line L(i)=L(j), which reflects higher contrast in the alternative analysis image portion that preferentially includes edge regions. The edge-based approach using an analysis image portion preferentially including edges typically generates spatial dependence distributions with higher entropy, capturing a higher variety of spatial dependencies for the luminance. In each of FIGS. 5, 6, and 7, both axes of the two dimensional plots correspond to luminance values. In FIGS. 6 and 7, the number of occurrences for each term of the co-occurrence matrix is represented by an intensity with zero occurrences corresponding to black, the precise (normalized) scale being shown by the scale bar to the right of each co-occurrence matrix.

With returning reference to FIG. 1, in some embodiments the contrast measure calculator 30 computes a global contrast measure for the analysis image or image portion that incorporates terms of the co-occurrence matrix, or a function of such terms, and a distance function, and further incorporates a tone reproduction curve. An example of such a global contrast measure is given in Equation (4):

$$F_{adj}(T(I)) = \int_{x \in \Omega} \int_{y \in \Omega} C(x, y) D(T(x), T(y)) dx\, dy, \qquad (4)$$

where T(I) is the tone reproduction curve operating on an intensity I (where the symbol "/" is used here as a placeholder), $F_{adj}(\ )$ is the global contrast measure incorporating the tone reproduction curve T(I), C(x,y) is a continuous function representation of the co-occurrence matrix terms, and $D(\ )$ is the distance function. In some embodiments, $D(\ )$ is symmetric and positive semi-definite, conditions satisfied for example by the inverted Gaussian distance function used in the global contrast representation $F_2$ of Equation (3). The symbol $F_{adj}$ is used in Equation (4) to indicate that the global contrast measure of Equation (4) is adjustable by adjusting the adjustable tone reproduction curve T(I). Contrast enhancement is suitably performed by adjusting T(I) to maximize $F_{adj}$, and then using the "best" T(I), namely that T(I) that gives an increased or maximum value for the adjustable global contrast measure $F_{adj}$, to adjust the tones of the target image to produce contrast enhancement. In referring to $F_{adj}$ as a global contrast measure, it is to be appreciated that it is global respective to the analysis image or image portion—however, the analysis image or image portion may itself be a portion of the target image or image portion. For example, the analysis image may be a portion of the target image that preferentially includes edges, as identified by the black pixels of the illustrative binary analysis image mask 20e or another suitable identifier.

The tone reproduction curve T(I) maps an input intensity to an output intensity. In this disclosure, the tone reproduction curve is sometimes also referred to as a tone transformation function 34 as shown in FIG. 1. A continuous monotonic tone transformation function is advantageous. As used herein, it is to be understood that a continuous monotonic tone transformation function is continuous and monotonic at least over a range of intensity values of the image being adjusted. If, for example, the image intensities are re-scaled to lie in the interval [0,1], then the continuous monotonic tone transformation function should be continuous and monotonic at least over the range (0,1). Typically, a continuous monotonic tone transformation function will be monotonically increasing; however, a monotonically decreasing tone transformation function is also contemplated, as such a tone transformation function can be used, for example, to simultaneously perform contrast enhancement and tonal inversion (for example, to convert a "negative photograph" into a "positive photograph"). In the illustrated embodiments, the intensities are rescaled to the interval [0,1]. The tone reproduction curve spans this interval, and satisfies the boundary conditions T(0)=0 and T(1)=1 (or, alternatively, T(0)=1 and T(1)=0 if tonal inversion is implemented). Tone compression is also contemplated, such that for example T(0)=0 and T(1)=0.5 which would compress the intensity range from [0,1] to [0,0.5]. However, tonal compression is typically not desired since it usually reduces contrast. In the illustrated embodiments, the tone reproduction curve T(I) is a smooth non-decreasing curve, although stepwise or other non-smooth tone reproduction curves are also contemplated.

With continuing reference to FIG. 1, in the illustrated embodiments an optimization engine 36 adjusts the tone transformation function T(I) to generate a contrast-enhancing tone transformation 38 that when applied to the analysis image or image portion enhances contrast as indicated by the contrast measure $F_{adj}(T(I))$ of Equation (4). For a global contrast measure in which a larger value corresponds to higher contrast, adjusting the adjustable tone transformation function T(I) to optimize the contrast measure $F_{adj}(T(I))$ corresponds to maximizing $F_{adj}(T(I))$ respective to the adjustable tone transformation function T(I). It is also contemplated to employ an adjustable contrast measure in which a smaller value corresponds to higher contrast, in which case adjusting the adjustable tone transformation function to optimize the contrast measure would correspond to minimizing the global contrast measure respective to the adjustable tone transformation function. Depending upon the particular contrast measure $F_{adj}(T(I))$, the optimization performed by the optimization engine 36 can be iterative or can employ a closed form solution. Moreover, the terms "optimize", "optimization" and similar terms as used herein are intended to encompass embodiments in which the optimization engine 36 finds a global optimum (e.g., a global maximum), and are also intended to encompass embodiments in which the optimization engine 36 adjusts the adjustable tone transformation function T(I) 34 to provide contrast enhancement that is enhanced but less than optimal or that provides a good, but perhaps not best, value for the contrast measure $F_{adj}(T(I))$. For example, the optimization engine 36 may terminate an iterative optimization when successive iterations improve the contrast measure $F_{adj}(T(I))$ by less than a selected percentage, or when successive iterations reach a sufficiently high value for the contrast measure $F_{adj}(T(I))$, or when successive iterations satisfy another selected stopping criterion. In such a case, the generated contrast-enhancing tone transformation 38 may provide less than optimal contrast enhancement, but nonetheless provides substantial contrast enhancement, and the value of the contrast measure $F_{adj}(T(I))$ is improved by the optimization but perhaps is not globally optimal.

The contrast-enhancing tone transformation 38 that is output by the optimization engine 36 is denoted herein as $T_{opt}(I)$. Once the contrast enhancing tone transformation $T_{opt}(I)$ 38 is determined, a contrast enhancer 40 applies the contrast enhancing tone transformation $T_{opt}(I)$ 38 to the luminance image 14 to produce a contrast enhanced luminance image 42. If each pixel is denoted by a position (X, Y) and has an intensity L(X, Y) then the contrast enhancer 40 suitably performs the contrast enhancement by the replacement operation $L_{CE}(X, Y) \leftarrow T_{opt}(L(X, Y))$ where $L_{CE}(X,Y)$ denotes the contrast enhanced intensity of the pixel (X, Y) and "←" denotes a replacement operation. For a three-dimensional image, the contrast enhancement operation is analogous: $L_{CE}(X, Y, Z) \leftarrow T_{opt}(L(X, Y, Z))$ where Z denotes the coordinate of the third dimension.

In the illustrated case of in which the original image is color image 8, the contrast enhanced luminance image 42 is recombined with the chrominance image 16 by a color image reconstructor 44 to generate a contrast enhanced color image 46. For the illustrated examples in which the color image 8 is in an (Y,I,Q) coordinate representation, the recomposition of the color image is straightforward since the luminance component (Y) is stored separately from the chrominance components (I,Q). For a representation in which luminance and chrominance components are intermingled, such as an (R,G,B) representation, one approach is to convert the image to (Y,I,Q) representation, apply the contrast enhancement processing to the luminance (Y) channel, recompose the color image (Y',I,Q) where Y' denotes the contrast enhanced luminance values, and convert the contrast enhanced (Y',I,Q) representation back into (R,G,B) color space.

Optionally, a user interface 50 enables a user to control the pre-processing performed by the preprocessor 18, the selected spatial relationship 28 upon which the co-occurrence matrix is computed, or other parameters of the contrast enhancement processing. In some embodiments, the user interface 50 may be a graphical user interface (for example, implemented as a computer having a graphical display and suitable input device or devices such as a keyboard, mouse, touch pad, stylus, or so forth, such details not being shown in FIG. 1). In some embodiments, the user identifies the analysis image region graphically, for example by drawing a loop or box around the region that should be used as the analysis region. In other embodiments, the user interface 50 allows the user to define an edge-identifying algorithm, or parameters of the edge-identifying algorithm, that is then used by the edge mask generator 18e to generate the analysis image portion preferentially including edge regions as identified by the edge-identifying algorithm. In some embodiments, the user interface 50 may comprise one or more buttons on a digital camera, camcorder, or other image acquisition device. For example, in one approach buttons may be provided to select "edge contrast enhancement", "face contrast enhancement", or "noise reduction", and the pre-processor selects the appropriate analysis image or image region based on the user selection. Other contemplated user interfaces include eye tracker or gaze tracker interfaces, which measure the eye position or eye gaze to determine what the eye is looking at. By tracking commonly viewed areas of an image, it is contemplated to develop a relevance map indicating those regions of the image that are most commonly viewed. Such a relevance map can be used to define the optional analysis image mask or pixel weights 20.

For embodiments in which "face contrast enhancement" is implemented, it is contemplated to employ an automated face detection algorithm to identify faces in the image. Face detection algorithms are well known, and include for example feature-based algorithms and pattern recognition-based algorithms. A review of some face detection algorithms is provided in Hjelmås et al., "Face Detection: A Survey", Computer Vision and Image Understanding vol. 83, pages 236-74 (2001). Alternatively, a graphical user interface, if provided, is optionally configured to allow the user to identify the face or faces for contrast enhancement by drawing a loop or box around each face.

Having described some illustrative contrast enhancement methods and systems, some additional examples are set forth. In this example, a parameterized continuous monotonic adjustable tone reproduction curve was used, and the parameters were adjusted to adjust the continuous monotonic tone reproduction curve towards an improved solution using a gradient descent approach. The parameterized adjustable continuous monotonic tone reproduction curve included a mixture of sigmoids or logistic functions. Sigmoids are advantageous for use in contrast enhancement operations since sigmoids tend to flatten the dark and light image regions and stretch the mid-luminance range. Instead of the gradient descent approach, dynamic programming techniques with monotonic constraints would also be suitable, as would least square minimization optimization algorithms, variational methods, and so forth. The sigmoid mixture used in these examples is scaled to be smooth and non-decreasing (i.e., monotonic increasing) with the boundary conditions that $T(0)=0$ and $T(1)=1$. The mixture of sigmoids is an example, and other continuous monotonic tone reproduction functions can be used instead. The sigmoid functions used herein included two parameters, namely slope and shift parameters. The sigmoid mixture included scaling to ensure that the boundary conditions $T(0)=0$ and $T(1)=1$ were satisfied. The sigmoids of the sigmoid function used herein are defined as follows:

$$s(x, a, b) = \frac{(1 - e^{-ax})}{(1 - e^{-a})} \frac{(1 + be^{-a})}{(1 + be^{-ax})}, \quad (5)$$

where the parameters a and b are, respectively, slope and shift parameters. The derivatives of the sigmoid with respect to the parameters a and b are:

$$\frac{\partial s}{\partial a} = (1 + b)s \left( \frac{xe^{-ax}}{(1 + be^{-ax})(1 - e^{-ax})} - \frac{e^{-a}}{(1 + be^{-a})(1 - e^{-a})} \right) \quad (6)$$

$$\frac{\partial s}{\partial b} = \frac{s}{(1 + be^{-a})} \frac{(e^{-a} - e^{-ax})}{(1 + be^{-ax})}.$$

A mixture of K sigmoid functions is then suitably defined as:

$$\hat{s}(x, \theta) = \hat{s}(x, a, b, w) \quad (7)$$
$$= \sum_{k=1}^{K} w_k s(x, a_k, b_k),$$
$$\sum_k w_k = 1,$$

and the derivatives can be obtained from Equation (6), except for the weight component w whose gradient is composed by the corresponding sigmoid components. For the optimization the gradient step is obtained by including Equation (7) in the global contrast measure to be optimized (given, for example, by Equation (4)) and differentiating with respect to the parameters. The derivative of the global contrast measure $F_{adj}$ of Equation (4) in this case is given by:

$$\frac{\partial F_{adj}}{\partial \theta} = \int_{x \in \Omega} \int_{y \in \Omega} C(x, y) \frac{\partial D}{\partial \hat{s}} \frac{\partial \hat{s}}{\partial \theta} dx dy. \quad (8)$$

Evaluation of the sigmoid mixture derivatives $$\frac{\partial \hat{s}}{\partial \theta}$$

are straightforward using Equation (6). Evaluation of the distance function derivative $$\frac{\partial D}{\partial \hat{s}}$$

is straightforward for typical distance functions D( ) such as the exponential-based distance function of Equation (3). In this example, the arguments T(x) and T(y) of D( ) in Equation (4) are given by the sigmoid mixture tone reproduction curve of Equation (7).

Figure 8:
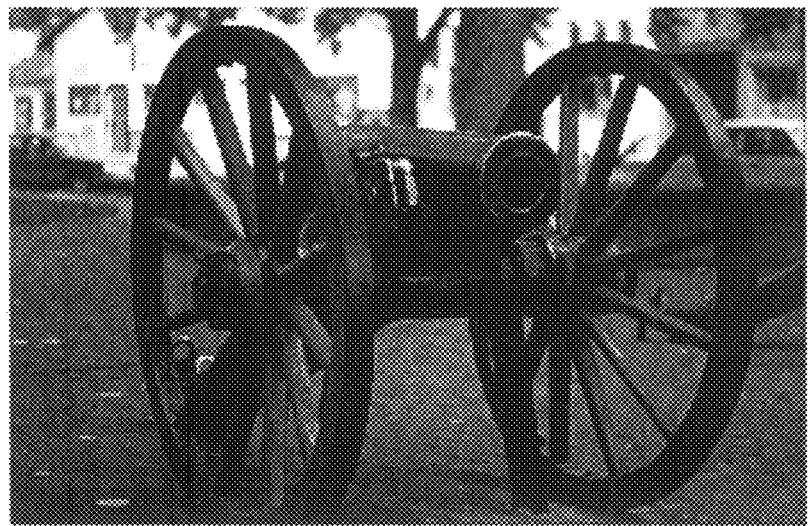
FIG. 8 shows an illustrative image of a cannon.
Figure 9:
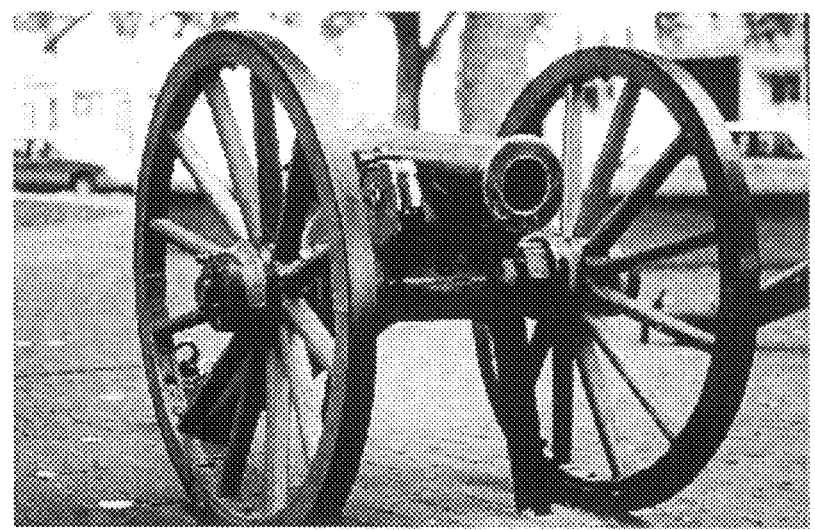
FIG. 9 shows a contrast enhanced image corresponding to the image of FIG. 8, where the contrast enhancement employs a tone transformation curve T(I) consisting of a single sigmoid.
Figure 10:
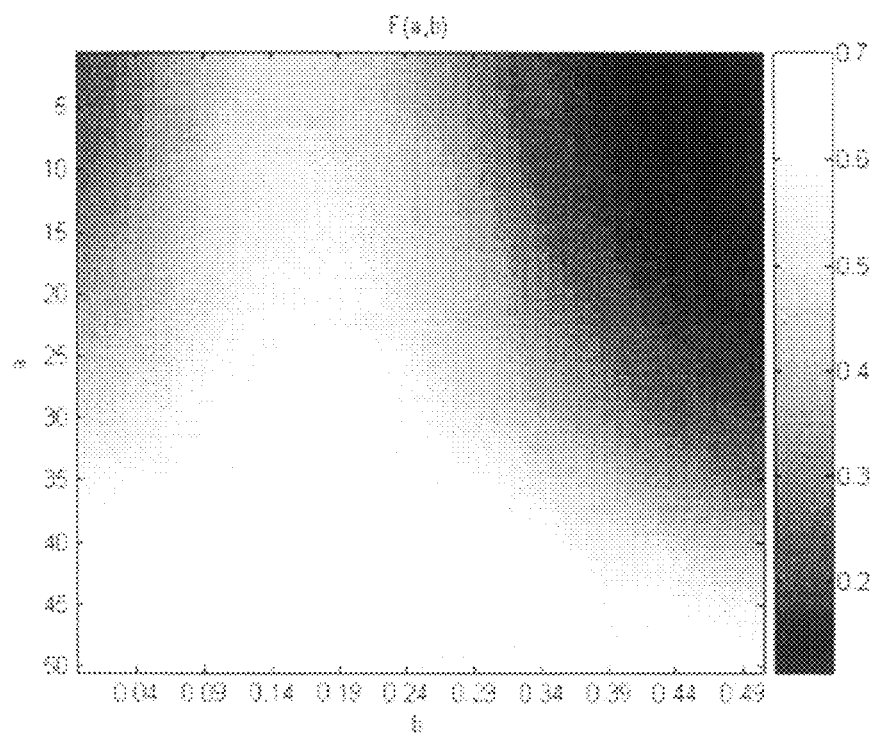
FIGS. 10 and 11 illustrate the optimization landscape for the contrast enhancement of FIG. 9.
Figure 11:
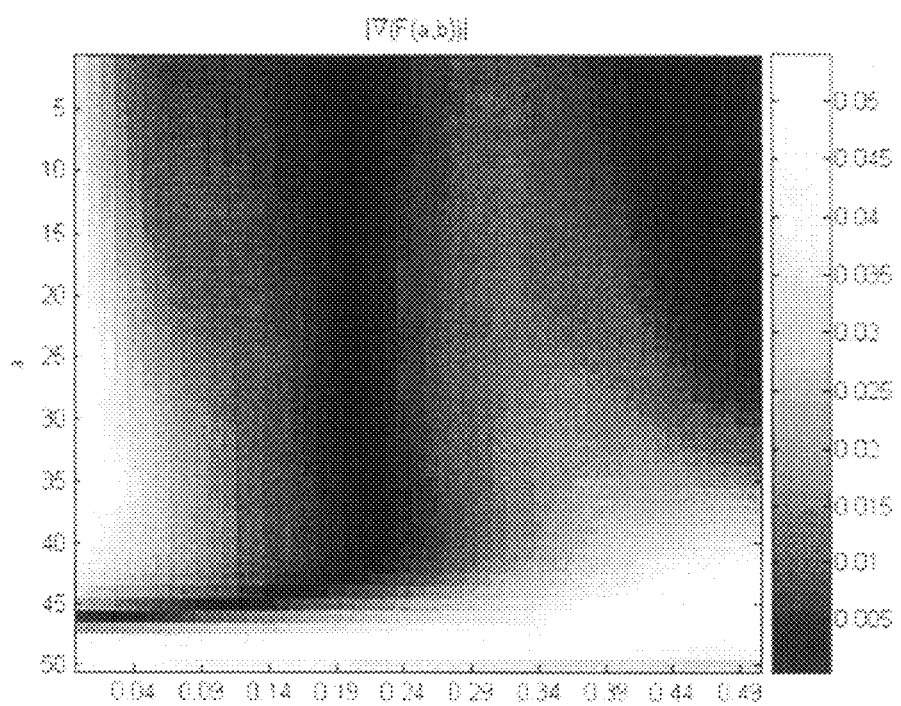

With reference to FIGS. 8-11, an illustrative image of a cannon is shown in FIG. 8. A corresponding contrast enhanced image is shown in FIG. 9, where the contrast enhancement employs a tone transformation curve T(I) consisting of a single sigmoid having parameters a and b as defined previously. FIGS. 10 and 11 illustrate the optimization landscape for such a contrast enhancement using a single sigmoid. FIG. 10 shows the global contrast measure F plotted against the sigmoid parameters a and b. FIG. 11 plots |∇F(a, b)| against the sigmoid parameters a and b. In FIGS. 10 and 11, the values of respective functions F and |∇F(a,b)| are represented by grayscale intensities with black corresponding to zero, the precise values being shown by the scale bar to the right of each plot.

In a suitable contrast enhancement approach, gradient descent optimization of the global contrast measure of Equation (4) is initialized from a random perturbation of the single sigmoid solution. Contrast enhancement experiments were performed using sigmoid mixtures including one, two, three, or more sigmoid components. It was found that using more than three sigmoid components in the sigmoid mixture provided limited improvement in the global contrast measure $F_{adj}$, and provided little or no visually perceptible improvement in the contrast enhanced image, as compared with the contrast enhancement using three sigmoid components. Thus, for the images tested a three sigmoid component mixture provided a good practical approach; however, it is contemplated that adjustable tone reproduction curves with fewer or more sigmoid components may be preferred depending upon the nature of the image, the desired amount of contrast enhancement balanced against computational load, the efficiency of the optimization algorithm, and so forth. Moreover, it is emphasized that the sigmoid mixture tone reproduction curve is an illustrative example, and that other parametric, semi-parametric, or non-parametric adjustable tone reproduction curves can be used.

Figure 12:
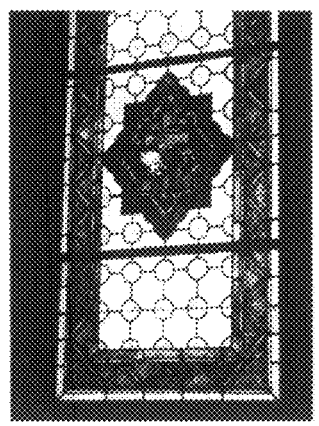
FIGS. 12-14 show a first contrast enhancement example.
Figure 13:
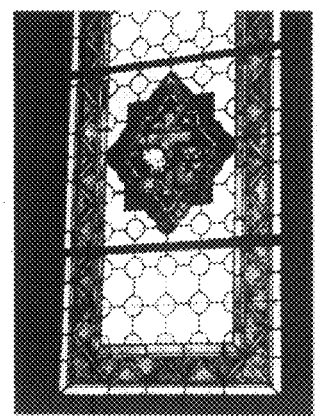
Figure 14:
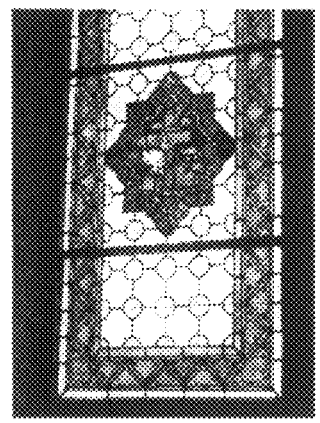
Figure 15:
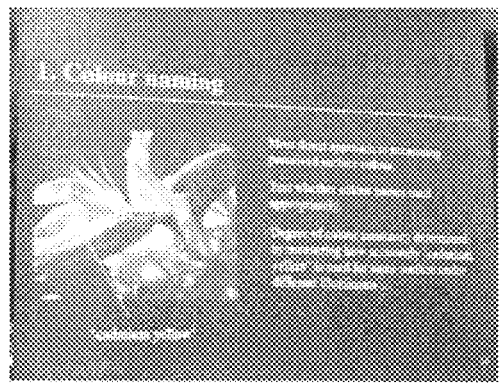
FIGS. 15-17 show a second contrast enhancement example.
Figure 16:
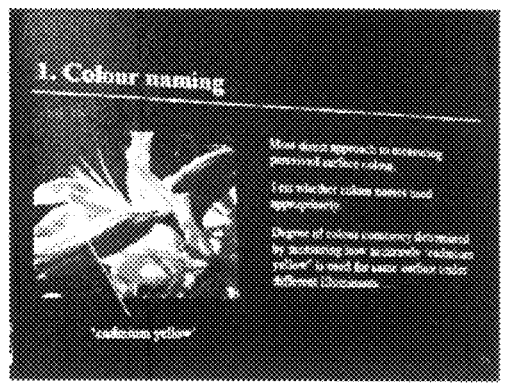
Figure 17:
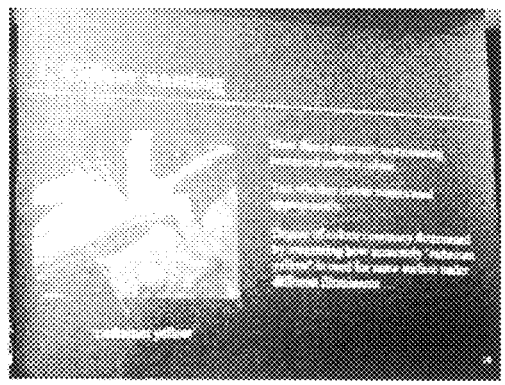
Figure 18:
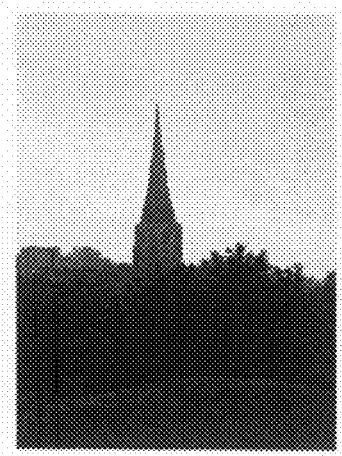
FIGS. 18-20 show a third contrast enhancement example.
Figure 19:
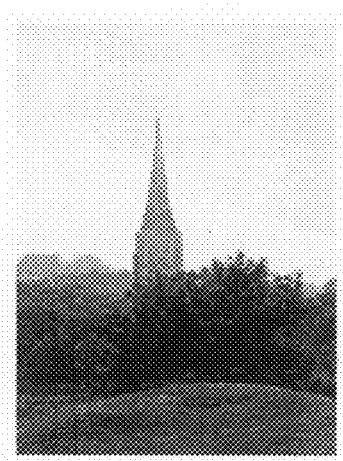
Figure 20:
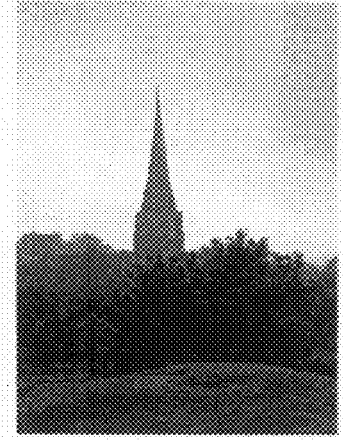

With reference to FIGS. 12-23, some illustrative contrast enhancement examples are shown. Four examples are shown: FIGS. 12-14 being one example; FIGS. 15-17 being a second example; FIGS. 18-20 being a third example; and FIGS.

21-23 being a fourth example. Each example used a similar adjustable model, in which the number of free parameters was two, the number of sigmoids in the mixture was three (i.e., K=3 in Equation (7)), and the inverted Gaussian distance function:

$$D(\sigma) = 1 - e^{-\frac{(x-y)^2}{2\sigma^2}}, \tag{9}$$

was used, where the parameters x, y, and σ are as defined as in Equation (3) and the luminance difference control parameter σ=0.02. Each of the images of FIGS. 12-23 is a color image, and are shown in FIGS. 12-14 after conversion to grayscale.

The first example is shown as follows. FIG. 12 shows an original image of a portion of a stained glass window. FIG. 13 shows the contrast enhanced image using optimization of the global contrast measure of Equation (4) with a three sigmoid-mixture adjustable tone reproduction curve and the exponential-based distance function of Equation (3). FIG. 14 shows a comparative image that was contrast enhanced using a conventional histogram equalization contrast enhancement method.

The second example is shown as follows. FIG. 15 shows an original image of a slide including a flower. FIG. 16 shows the contrast enhanced image using optimization of the global contrast measure of Equation (4) with a three sigmoid-mixture adjustable tone reproduction curve and the exponential-based distance function of Equation (3). FIG. 16 shows a comparative image that was contrast enhanced using a conventional histogram equalization contrast enhancement method.

The third example is shown as follows. FIG. 18 shows an original image of a landscape including a steeple. FIG. 19 shows the contrast enhanced image using optimization of the global contrast measure of Equation (4) with a three sigmoid-mixture adjustable tone reproduction curve and the exponential-based distance function of Equation (3). FIG. 20 shows a comparative image that was contrast enhanced using a conventional histogram equalization contrast enhancement method.

Figure 21:
FIGS. 21-23 show a fourth contrast enhancement example.
Figure 22:
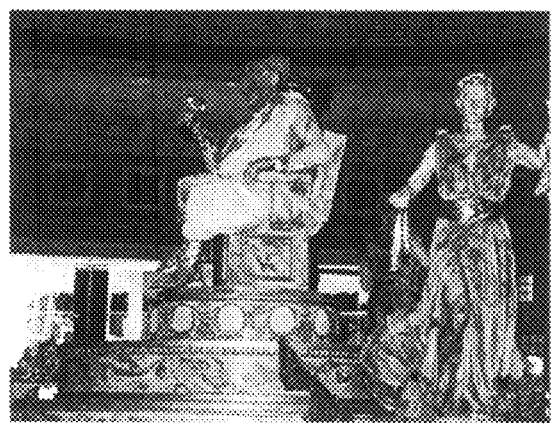
Figure 23:

The fourth example is shown as follows. FIG. 21 shows an original image of a statue. FIG. 22 shows the contrast enhanced image using optimization of the global contrast measure of Equation (4) with a three sigmoid-mixture adjustable tone reproduction curve and the exponential-based distance function of Equation (3). FIG. 23 shows a comparative image that was contrast enhanced using a conventional histogram equalization contrast enhancement method.

The examples of FIGS. 12-23 illustrate good contrast enhancement performance achieved using a computationally simple form of the disclosed method with few adjusted parameters. In some global contrast enhancement tests performed using the disclosed techniques, the achieved global contrast enhancement was comparable to local contrast enhancement techniques. In the first example of FIGS. 12-14, the conventional histogram equalization technique (FIG. 14) gave excessive range to flat regions in the borders, whereas the present approach (FIG. 13) improved the contrast enhancement in this aspect. The second example of FIGS. 15-17 also shows this effect—the black background remains "washed out" in the conventional histogram equalization technique as shown in FIG. 17, whereas a darker black background is achieved by the present approach as shown in FIG. 16.

The disclosed contrast enhancement techniques can be implemented in various ways. In some embodiments, a storage medium store instructions executable to perform a contrast enhancement method including operations such as computing a contrast measure incorporating an adjustable continuous monotonic tone transformation function and one or more statistical measures of selected spatial arrangements of pixel or voxel intensities in an analysis image or image portion, adjusting the adjustable continuous monotonic tone transformation function to increase contrast as indicated by the contrast measure, and enhancing contrast of a target image or image portion using the adjusted continuous monotonic tone transformation function. Such a storage medium may be, for example: an optical disk such as a CD or DVD disk; a magnetic disk such as a hard drive, RAID array of magnetic disks, or so forth; programmable read-only memory (PROM); an erasable programmable read-only memory (EPROM); a flash memory; a dynamic memory such as a random access memory (RAM); a magnetic tape; or so forth. The instructions may be executable, for example, on a microprocessor, microcontroller, computer, personal media player such as a portable music player with image display capability, digital electronics of a camera, camcorder, or other digital imaging device, or so forth. In other embodiments, some or all of the contrast enhancement functionality is implemented as an application-specific integrated circuit (ASIC) or using other dedicated electronics.

In some embodiments, the disclosed contrast enhancement techniques disclosed herein are implemented as software components of photofinishing software or other image processing software that is executed on a personal computer, notebook computer, desktop computer, or other interactive computer system. In such embodiments, the image processing software including the instructions executable to perform contrast enhancement are stored on a storage medium, and the instructions are executable by the personal computer, notebook computer, desktop computer, or other interactive computer system. In a variation on such embodiments, it is contemplated for the instructions executable to perform contrast enhancement to be stored and executed at a remote server, accessed for example via the Internet or a local area network, and for the personal computer, notebook computer, desktop computer, or other interactive computer system to serve principally as the user interface.

Figure 24:
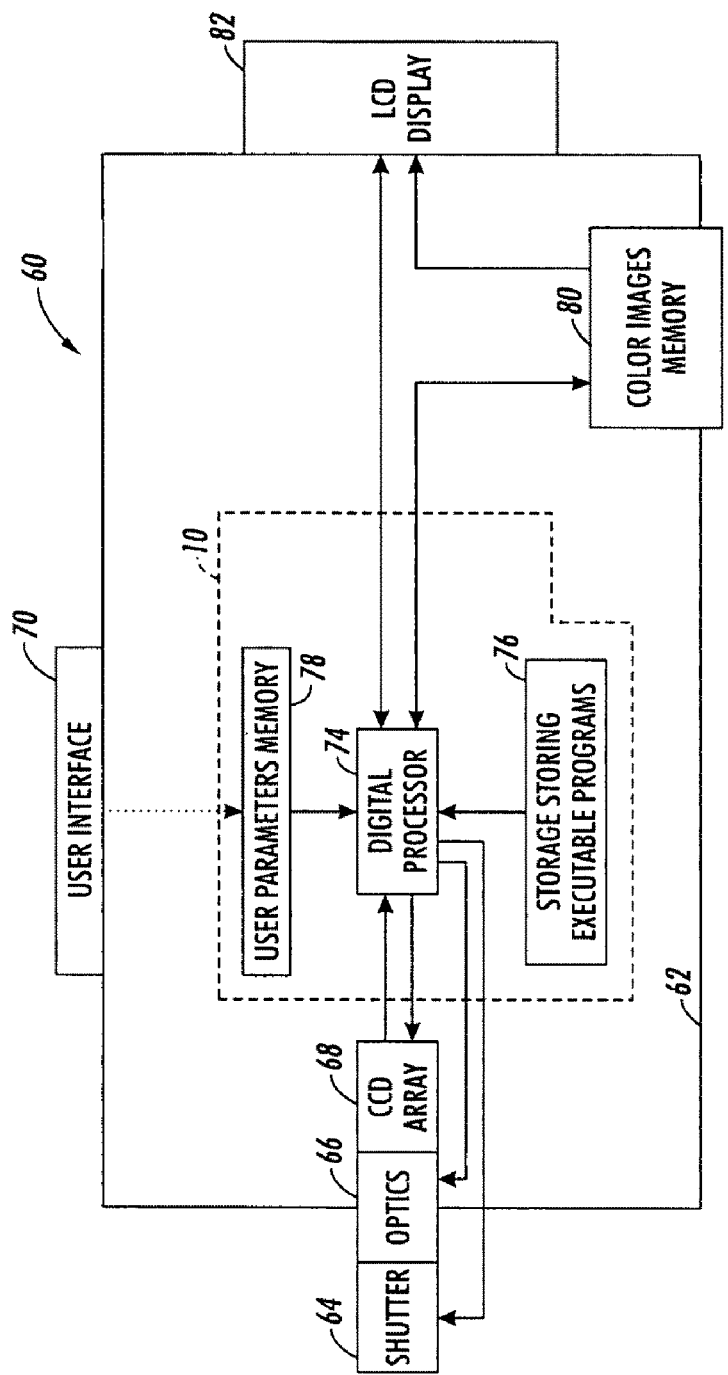
FIG. 24 diagrammatically shows a digital camera incorporating an embodiment of the contrast enhancement apparatus of FIG. 1.

With reference to FIG. 24, in other embodiments the disclosed contrast enhancement techniques are implemented as an integral part of a digital image acquisition device. FIG. 24 diagrammatically depicts an illustrative digital camera 60 that includes a camera housing 62. A shutter 64, lens or other optics 66, and charge-coupled device (CCD) array 68 or other two-dimensional array of photosensors are mounted on or in the digital camera housing 62. The digital camera 60 includes a user interface 70 typically including buttons, sliders, dials, touch-sensitive surfaces, or other input mechanisms for receiving user input. For example, the user interface 70 includes a shutter release button for user initiation of an image acquisition—when the user presses the shutter release button, the shutter 64 opens for a selected exposure time during which the CCD array 68 is exposed to light from the imaged subject via the optics 66. The user interface 70 typically includes other functionality such as for setting shutter speed and other imaging parameters. The user interface 70 optionally includes input functionality for selecting to contrast enhance acquired images, and optionally includes functionality for controlling contrast enhancement parameters.

The camera housing 62 further has mounted thereon or therein an embodiment of the illustrative contrast enhancement apparatus 10 shown in FIG. 1, implemented as a digital processor 74 that executes instructions stored as software or firmware in a digital storage medium 76. A user parameters memory 78 optionally stores user parameters for the contrast enhancement, such as the selected spatial relationship 28 for constructing the co-occurrence matrix terms or function thereof 26, or parameters constraining the pre-processing performed by the pre-processor 18, or so forth. In some embodiments, the processor 74, storage 76, and parameters memory 78 are dedicated solely to the contrast enhancement operation. In other embodiments, some or all of the processor 74, storage 76, and parameters memory 78 are used for both contrast enhancement and for other operations such as image acquisition, image display, or so forth. In the illustrated embodiment, the processor 74 is a general-purpose processor that performs general computational operations for the digital camera 60, such as image acquisition, focusing or autofocusing, image stabilization, or so forth, in addition to contrast enhancement.

The image, optionally after undergoing contrast enhancement, is stored in a color images memory 80. In some embodiments, the color images memory 80 is a removable unit, such as a memory stick, memory card, or so forth, which can be selectively inserted into and removed from the digital camera 62 and can further be selectively inserted into and removed from other digital devices such as a suitably configured digital card reader operatively coupled with a computer. The processor 74 further optionally executes suitable instructions recalled from the storage 76 to display the acquired, and optionally contrast enhanced, image on a built-in LCD display 82 or other image display. In some embodiments, the image may initially be displayed without contrast enhancement, and the user has the option to select, via the user interface 70, to apply the contrast enhancement to the acquired image. In such an approach, the user can see the initial image via the display 82, can then see the contrast enhanced image, and can then decide whether to store in the memory 80 the original image, the contrast enhanced image, or, optionally, both the original image and the contrast enhanced image.

The illustrated digital camera 60 is a still camera used for taking discrete photographs. In some embodiments, the digital camera 60 can be operated in a burst mode in which a succession of images are rapidly acquired, for example at a rate of thirty acquired images per second, to form a short video clip. Each individual image of the video clip is optionally processed by the contrast enhancement apparatus 10 to provide contrast enhanced video. In other embodiments (not illustrated), a dedicated video camera, such as a camcorder, acquires images at a rate of thirty images per second or some other rate sufficiently high to appear to a human viewer as a continuous video, and the contrast enhancement apparatus 10 processes each image of the video stream to provide contrast enhanced video.

Figure 25:
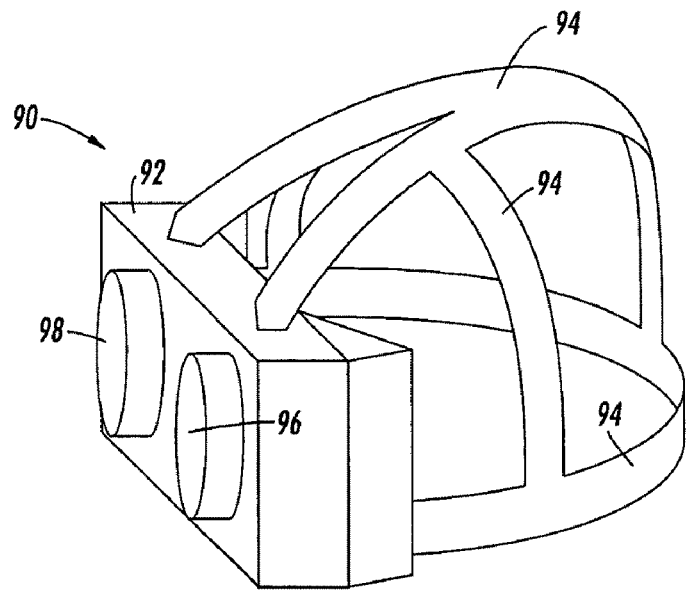
FIG. 25 shows a perspective view of night vision goggles incorporating an embodiment of the contrast enhancement apparatus of FIG. 1.
Figure 26:
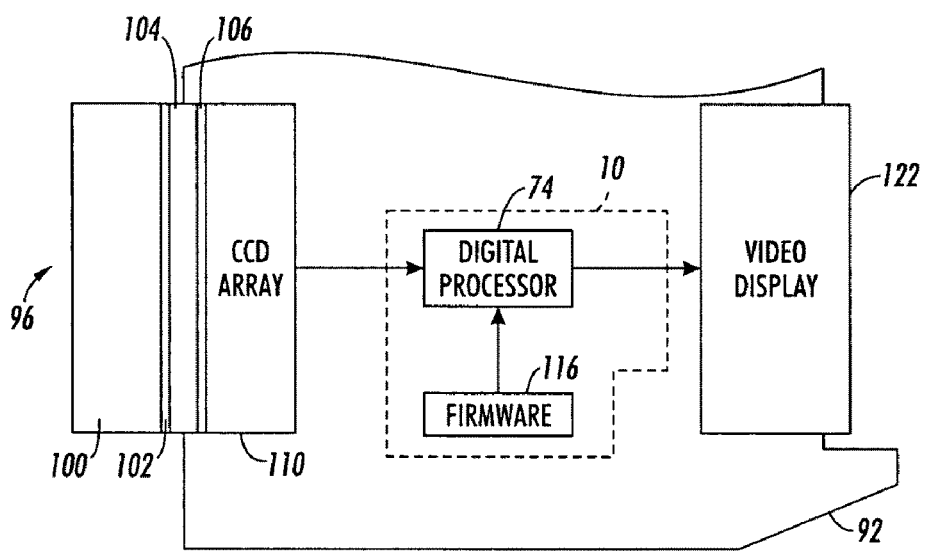
FIG. 26 diagrammatically shows the configuration of the left-side of the night-vision goggles of FIG. 25.

With reference to FIGS. 25 and 26, illustrative night-vision goggles 90 include a goggles housing 92 and retaining straps 94 for strapping and retaining the goggles housing 92 onto a wearer's head with left and right optics 96, 98 of the goggles operatively coupled with the wearer's left and right eyes, respectively. FIG. 26 diagrammatically shows the configuration of the left-side of the night-vision goggles. (The configuration of the right-side is analogous). The illustrated left optic 96 includes collection and focusing optics 100. A photocathode 102 of gallium arsenide or another material exhibiting a photoelectric effect converts the collected light into electrons. A microchannel plate (MCP) 104 amplifies the electrons, and a phosphor layer 106 converts the amplified electrons into an amplified image. The image enhancement chain 100, 102, 104, 106 is an illustrative example, and other image enhancement optics can be used instead. In some embodiments, the image enhancement optics are configured to be especially sensitive to thermal radiation, so as to provide enhanced thermal imaging. The amplified image is captured by a CCD array 110 or other two-dimensional array of photosensors to produce a digital enhanced image. To provide approximately real-time imaging, the CCD array 110 preferably acquires images in rapid succession, for example thirty images per second.

The night-vision goggles 90 further include an embodiment of the contrast enhancement apparatus 10 which includes digital processor 74 as in the digital camera 60 of FIG. 24. The executable instructions are suitably stored in firmware 116, such as an EPROM or ROM, and the processor 74 performs contrast enhancement for each acquired amplified image. Each successive contrast enhanced image is displayed on a video display 122, which may for example be an LCD display, to provide approximately real-time enhanced vision. Although not shown in FIGS. 25 and 26, the night vision goggles optionally include a user interface to enable the user to input parameters for controlling the contrast enhancement.

Example embodiments have been described with reference to the illustrations of FIGS. 1-26. While not illustrated herein, it is to be appreciated that the contrast enhancement methods and apparatuses disclosed herein are readily combined with other image processing such as binary thresholding, color correction, cropping, or so forth, in an overall image processing chain.

In the illustrated embodiments, the analysis image is derived from the target image or image portion for contrast enhancement. For example, the analysis image may be the entire target image, or the edge regions of the target image, or a face region, or so forth. The spatial dependence statistics and contrast-enhancing tone transformation curve are derived from this analysis image or image portion, and the contrast-enhancing tone transformation curve is applied to the target image or image portion.

In some contemplated embodiments, however, the analysis and target images are wholly different. For example, it is contemplated to derive the contrast-enhancing tone transformation curve from one or more training images that serve as the analysis image or image portion, and to apply the derived contrast-enhancing tone transformation curve to target images that are not part of the set of one or more training images.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A contrast enhancement method comprising:
   computing a global contrast measure based on a count of occurrences of a selected spatial arrangement of two or more pixels or voxels having selected pixel or voxel intensities in an analysis image or image portion;
   adjusting an adjustable tone transformation function to generate a contrast-enhancing tone transformation that optimizes the global contrast measure; and
   enhancing contrast of a target image or image portion using the contrast-enhancing tone transformation;

wherein the computing, adjusting, and enhancing are performed by a digital processor
wherein the computing of the global contrast measure comprises:
computing at least some terms or a function of term of a co-occurrence matrix for the analysis image or image portion; and
computing the global contrast measure based on the computed terms or function,
wherein the global contrast measure comprises a double integral or double summation of:

$$C_{ij} \cdot D(T(i), T(j))$$

where indices i and j denote intensity values over which the double integral or double summation is computed, $C_{ij}$ denote computed terms or a function of terms of a co-occurance matrix, $D(T(i), T(j))$ denotes an intensity distance metric between $T(i)$ and $T(j)$, and T( ) denotes the adjustabletone transformation function.

2. The contrast enhancement method as set forth in claim 1, wherein the computing of the global contrast measure comprises:
computing at least some terms or a function of terms of a multi-dimensional distribution over multiple intensity dimensions for the analysis image or image portion, wherein the computing of the global contrast measure depends at least on the computed terms or function and on the adjustable tone transformation function.

3. The contrast enhancement method as set forth in claim 2, wherein the adjustable tone transformation function is a parameterized tone transformation function and the adjusting comprises adjusting parameters of the parameterized tone transformation function.

4. The contrast enhancement method as set forth in claim 1, wherein the adjustable tone transformation function is a continuous monotonic function.

5. The contrast enhancement method as set forth in claim 1, further comprising:
acquiring the target image; and
deriving the analysis image or image portion from the target image.

6. The contrast enhancement method as set forth in claim 1, further comprising:
acquiring the target image, the analysis image being identical with the acquired target image.

7. The contrast enhancement method as set forth in claim 1, further comprising:
selecting the analysis image portion;
wherein the selecting is biased to include edges.

8. The contrast enhancement method as set forth in claim 1, further comprising:
selecting the analysis image portion;
wherein the selecting is biased to include a face or a plurality of faces.

9. The contrast enhancement method as set forth in claim 1, wherein the computing of a global contrast measure includes weighting contributions of pixels or voxels of the analysis image or image portion to enhance an impact of relatively higher contrast regions of the analysis image or image portion on the contrast measure relative to an impact of relatively lower contrast regions of the analysis image or image portion.

10. The contrast enhancement method as set forth in claim 1, further comprising:
receiving a color image; and
extracting a luminance image from the color image, the analysis image or image portion comprising the luminance image or a portion thereof.

11. The contrast enhancement method as set forth in claim 1, further comprising:
rescaling intensity values of the pixels or voxels of the analysis image or image portion to a pre-defined range prior to the computing of the global contrast measure.

12. An apparatus comprising:
a co-occurrence matrix calculator configured to compute at least some co-occurrence matrix terms or a function of co-occurrence matrix terms for an analysis image or image portion;
a contrast measure calculator configured to compute a contrast measure for the analysis image or image portion as a double integral or double summation of:

$$C_{ij} \cdot f(T(i), T(j))$$

where indices i and j denote intensity values over which the double integral or double summation is computed, $C_{ij}$ denote computed co-occurrence matrix terms or a function of co-occurrence matrix terms, T( ) denotes the adjustable tone transformation function, and $f( )$ denotes a discrete or continuous function of the tone transformation function applied to the intensity indexed by i and the intensity indexed by j;
an optimization engine configured to adjust an adjustable tone transformation function to generate a contrast-enhancing tone transformation that optimizes the contrast measure computed by the contrast measure calculator for the analysis image or image portion; and
a contrast enhancer configured to enhance contrast of a target image or image portion using the contrast-enhancing tone transformation.

13. The apparatus as set forth in claim 12, further comprising:
an imaging sensor configured to acquire the target image; and
a pre-processor configured to select the analysis image or image portion as a portion or all of the acquired target image.

14. The apparatus as set forth in claim 12, wherein the co-occurrence matrix calculator, contrast measure calculator, optimization engine, and contrast enhancer comprise one or more digital processors executing software or firmware instructions.

15. The apparatus as set forth in claim 12, wherein the optimization engine is configured to adjust the adjustable tone transformation function to generate the contrast-enhancing tone transformation using an iterative optimization algorithm.

16. The apparatus as set forth in claim 12, wherein the optimization engine is configured to adjust an adjustable continuous monotonic tone transformation function to generate a contrast-enhancing continuous monotonic tone transformation that when applied to the analysis image or image portion enhances contrast as indicated by the contrast measure.

17. An imaging device comprising:
an imaging sensor configured to acquire an image;
a processor configured to:
compute a contrast measure for the acquired image or a selected portion thereof as a double integral or double summation of $C_{ij} \cdot f(T(i), T(j))$ where indices i and j denote intensity values over which the double integral or double summation is computed, $C_{ij}$ denote computed co-occurrence matrix terms or function of co-occurrence matrix terms, T( ) denotes an adjustable continuous tone transformation function, and $f( )$ denotes a discrete or continuous function of the tone transformation function applied to the intensity indexed by i and the intensity indexed by j, adjust the adjustable continuous tone transformation function to generate a contrast-enhancing tone transformation function that optimizes the contrast measure, and apply the contrast-enhancing tone transformation function to the acquired image to generate a contrast enhanced image; and an output including at least one of a display configured to display the contrast enhanced image, and digital data storage configured to store the contrast enhanced image.

18. The imaging device as set forth in claim 17, further comprising:

a digital camera housing, the imaging sensor including a two-dimensional array of photosensors and operatively coupled optics, wherein the imaging sensor, the processor, and the output are mounted on or in the digital camera housing.

19. The imaging device as set forth in claim 17, further comprising:

night vision goggles, the imaging sensor including image enhancement optics and a two-dimensional array of photosensors, wherein the imaging sensor, the processor, and the output are mounted on or in the infrared goggles.

20. A non-transitory storage medium storing instructions executable to perform a contrast enhancement method including the operations of (i) computing a contrast measure incorporating an adjustable continuous monotonic tone transformation function and co-occurrence matrix terms or a function of co-occurrence matrix terms in an analysis image or image portion, (ii) adjusting the adjustable continuous monotonic tone transformation function to optimize the contrast measure, and (iii) enhancing contrast of a target image or image portion using the adjusted continuous monotonic tone transformation function wherein the contrast measure comprises a double integral or double summation of:

$$C_{ij} \cdot f(T(i), T(j))$$

where indices i and j denote intensity values over which the double integral or double summation is computed, $C_{ij}$ denotes the co-occurrence matrix terms or function of co-occurrence matrix terms, $T(\ )$ denotes the adjustable continuous monotonic tone transformation function, and $f(T(i), T(j))$ denotes a discrete or continuous function $f(\ )$ of $T(\ )$ applied to pixel or voxel intensity i denoted $T(i)$ and of $T(\ )$ applied to pixel or voxel intensity j denoted $T(j)$.

21. The non-transitory storage medium as set forth in claim 20, wherein the computing of a contrast measure comprises incorporating a parameterized continuous monotonic tone transformation function, and the adjusting comprises adjusting parameters of the parameterized continuous monotonic tone transformation function to increase contrast as indicated by the contrast measure.

22. The non-transitory storage medium as set forth in claim 20, wherein the computing of a contrast measure comprises incorporating a tone transformation function including a mixture of sigmoid functions.

* * * * *